United States Patent
Kennedy et al.

(10) Patent No.: US 8,384,707 B2
(45) Date of Patent: *Feb. 26, 2013

(54) METHOD FOR SYNCHRONIZING DISPLAY OF IMAGES IN A MULTI-DISPLAY COMPUTER SYSTEM

(75) Inventors: Joseph P. Kennedy, Palo Alto, CA (US); John A. Klenoski, Freemont, CA (US); Greg Sadowski, Cambridge, MA (US)

(73) Assignee: RPX Corporation, San Francisco, CA (US)

( * ) Notice: Subject to any disclaimer, the term of this patent is extended or adjusted under 35 U.S.C. 154(b) by 942 days.

This patent is subject to a terminal disclaimer.

(21) Appl. No.: 12/393,511

(22) Filed: Feb. 26, 2009

(65) Prior Publication Data

US 2010/0110062 A1    May 6, 2010

Related U.S. Application Data

(63) Continuation of application No. 10/695,779, filed on Oct. 30, 2003, now Pat. No. 7,499,044.

(51) Int. Cl.
*G09G 5/00*    (2006.01)
(52) U.S. Cl. ........... 345/213; 345/1.1; 345/504; 327/39; 327/47

(58) Field of Classification Search ............ 345/1.1–1.2, 345/211–213, 504; 327/39, 47
See application file for complete search history.

(56) References Cited

U.S. PATENT DOCUMENTS

| | | |
|---|---|---|
| 5,880,745 A | 3/1999 | Miichi |
| 5,982,396 A * | 11/1999 | Kim .............................. 345/572 |
| 6,078,225 A | 6/2000 | Bontekoe et al. |
| 6,337,682 B1 | 1/2002 | Hwang |
| 6,646,645 B2 | 11/2003 | Simmonds et al. |
| 6,704,381 B1 | 3/2004 | Moyal et al. |
| 2001/0022523 A1 | 9/2001 | Takami |
| 2002/0118201 A1 | 8/2002 | Mukherjee et al. |
| 2002/0159130 A1 | 10/2002 | Sakano et al. |

\* cited by examiner

*Primary Examiner* — Seokyun Moon
(74) *Attorney, Agent, or Firm* — Sterne, Kessler, Goldstein & Fox, P.L.L.C.

(57) ABSTRACT

An image display system synchronizes the display of images on a plurality of display devices. The method entails generating at a first computer system a first signal representing first image data to be displayed on a first display device, generating at a second computer system a second signal representing second image data to be displayed on a second display device, and a method for synchronizing the first and second image data. The synchronizing method includes using a phase-locked loop circuit having a digital rate controller. The digital rate controller allows programmable control of the speed of the phase-locked loop.

25 Claims, 6 Drawing Sheets

METHOD FOR SYNCHRONIZING DISPLAY OF IMAGES IN A MULTI-DISPLAY COMPUTER SYSTEM

CROSS-REFERENCE TO RELATED APPLICATIONS

This application is a continuation of U.S. application Ser. No. 10/695,779, filed Oct. 30, 2003, now U.S. Pat. No. 7,499,044, which is incorporated by reference herein in its entirety.

BACKGROUND OF THE INVENTION

1. Field of the Invention

The present invention is directed to synchronizing video and graphics images displayed on multiple display devices.

2. Background Art

Obtaining visual realism is crucial in computer graphics systems. To this end, it is often necessary to use multiple video or graphics processors to produce multiple levels of images on a single display device (e.g., a CRT, LCD, active matrix or plasma display). In the alternative, some video or graphics systems seek to achieve visual reality by generating a large visual image across multiple display devices. Each processor contributes to the overall image by providing a video or graphics signal representing, for example, either a front, left, or right view of the scene being displayed. Proper synchronization between the signals being provided to the various display devices is key to maintaining the reality of the scene being presented.

Several standards have been established that define various formats for video signals. The National Television Standards Committee (NTSC), Phase Alternate Line (PAL), and SEquential Couleur Avec Memoire (SECAM) are three widely accepted formats for television signals. Similarly, standards such as Video Graphics Array (VGA) and Monochrome Display Adaptor (MDA) are used to define display formats for computer displays. Depending on the standard used, a particular number of pixels, for example, 720, will be used to define a display or scan line. The scan lines are separated by synchronization pulses.

Horizontal synchronization (H-sync) pulses and Vertical synchronization (V-sync) pulses are two key components of the signals that are used to provide synchronization between multiple displays. These pulses represent the beginning of a new scan line in either the horizontal or vertical direction. When the horizontal or vertical synchronization pulses of the video signals generated by the participating processors are not aligned, visible distortions will be apparent.

Phase-locked loop (PLL) techniques are used to provide horizontal synchronization between multiple displays. Generally, these techniques phase-lock the horizontal synchronization pulse from a slave processor to the horizontal synchronization pulse of a master processor. A drawback to using a conventional phase-locked loop, however, is that the loop speed is fixed. A slow loop will be slow to adapt when the signals get out of synchronization. In contrast, a very fast loop will snap the signals into synchronization, often causing visible distortions or jitter in the display.

Vertical synchronization is usually achieved by resetting the vertical position of the slave processor upon the occurrence of a vertical reset in the master processor. In this way, vertical synchronization is achieved immediately. This process of "snapping" or causing the processors to become immediately synchronized with respect to their vertical positions also results in visible distortions.

Synchronization is made more difficult by the varying complexities of the images being presented on the various displays. As a result, many graphics systems will become desynchronized and/or produce visual artifacts or distortions in the resulting image. What is needed is a solution that will provide for vertical and horizontal synchronization of multiple displays while avoiding visual distortions.

BRIEF SUMMARY OF THE INVENTION

The invention is an image display system for synchronizing the display of images on a plurality of display devices. The system includes a first computer system generating a first signal representing first image data to be displayed on a first display device, a second computer system generating a second signal representing second image data to be displayed on a second display device, and means for synchronizing the first and second image data.

In a first embodiment of the invention, the computer systems are arranged in a non-hierarchical configuration. A master sync signal is provided to both computer systems by a master sync signal generator or the like (which can be, for example, any video source). Each computer system includes synchronizing means that receives the master sync signal and causes the computer system to synchronize its output to this master sync signal.

Each synchronizing means includes a sync separator for receiving the master sync signal and producing a master pulse stream, a phase detector for comparing the master pulse stream to a slave pulse stream to produce a difference pulse stream, a low pass filter for filtering the difference pulse stream to produce an analog signal, a voltage controlled oscillator for producing a clock signal in response to the analog signal, and the digital rate controller. The digital rate controller divides the clock signal by a divisor value to produce the slave pulse stream and produces the divisor value based on a programmable rate value and a comparison of the master pulse stream and the slave pulse stream. A video generator generates a video signal based on the clock signal.

This first embodiment of the invention is adapted for synchronizing the display of video images generated by the two computer systems.

In a second embodiment, the computer systems are arranged in a master/slave configuration. In such a configuration, the first signal generated by the first computer system (i.e., the master) is used as a sync signal for the second computer system (and any other systems to be synchronized). The sync signal is received by the synchronizing means in the second computer system. The synchronizing means includes a phase-locked loop (PLL) circuit having a digital rate controller to control a lock rate of the phase-locked loop circuit.

The synchronizing means includes a sync separator for receiving the first signal and producing a master pulse stream, a phase detector for comparing the master pulse stream to a slave pulse stream to produce a difference pulse stream, a low pass filter for filtering the difference pulse stream to produce an analog signal, a voltage controlled oscillator for producing a clock signal in response to the analog signal, and the digital rate controller. The digital rate controller divides the clock signal by a divisor value to produce the slave pulse stream and produces the divisor value based on a programmable rate value and a comparison of the master pulse stream and the slave pulse stream.

This second embodiment of the invention is adapted for synchronizing the display of computer graphics images generated by the two computer systems.

Another aspect of the invention is the phase-locked loop circuit having a digital rate controller. The digital rate controller feature allows the phase-locked loop to be programmable so that its speed can be adjusted to react more quickly or more slowly to changes.

Further features and advantages of the present invention, as well as the structure and operation of various system and method embodiments of the present invention are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE INVENTION

As described above, some video or graphics systems seek to achieve visual reality by generating a large visual image across multiple display devices. In such systems, several video or graphics signals are being generated. To avoid the creation of visible distortions, proper synchronization between the video signals is critical.

Figure 5A:
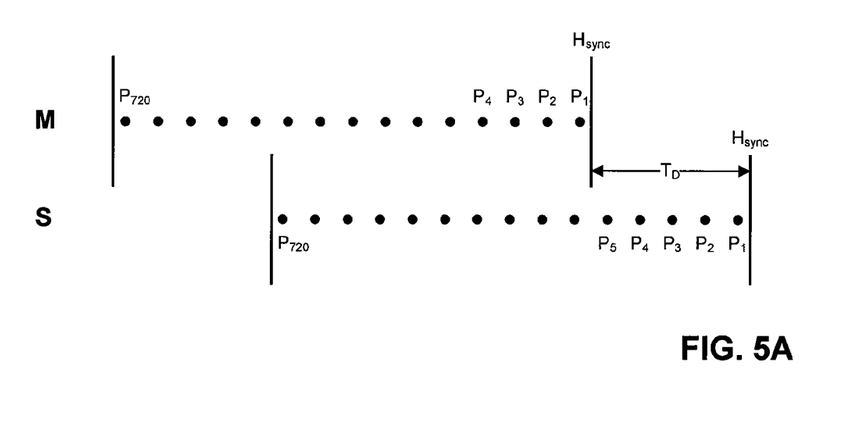
FIGS. 5A-5B illustrate an exemplary horizontal synchronization timing relationship between multiple displays.
Figure 5B:
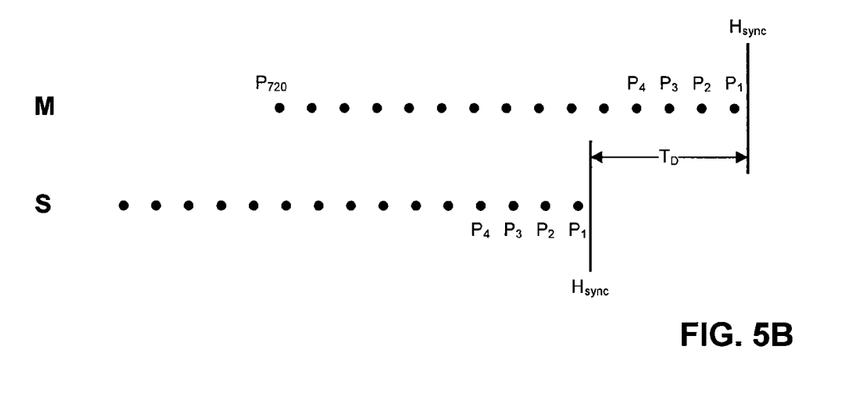

In the case of video signals, the signals typically conform to a standard format. For example, each system could be configured to generate an image frame that is made up of 720 pixels per line. While the processors might each be generating 720 pixels per line, it is possible that they are not generating them at the same rate. Consequently, one processor might be at different point on the scan line than another. As a way of determining where each processor is with respect to processing a scan line, each processor provides a synchronization pulse, such as a horizontal or vertical synchronization pulse, to indicate the end of each line. Visible distortions will be apparent when the horizontal or vertical synchronization pulses are not aligned. FIGS. 5A and 5B illustrate exemplary pulse streams that are not synchronized.

Referring to FIG. 5A, a pulse stream from a master processor (M) and a pulse stream from a slave processor (S) are shown. In this example, each system is shown generating pulse streams (from right to left) at a rate of 720 pixels per cycle. A horizontal synchronization pulse ($H_{sync}$) is added at the beginning of each new horizontal line. As is evident from the comparison of the two pulse streams shown in FIG. 5A, the slave processor is running faster than the master (i.e., the slave processor is issuing $H_{sync}$ pulses ahead of the master processor when viewed from right to left in FIG. 5A). The difference in time is represented by the notation TD. Similarly, in FIG. 5B, the master processor is shown running ahead of the slave processor. Consequently, visual distortions are likely to be apparent in the associated displays.

Figure 1:
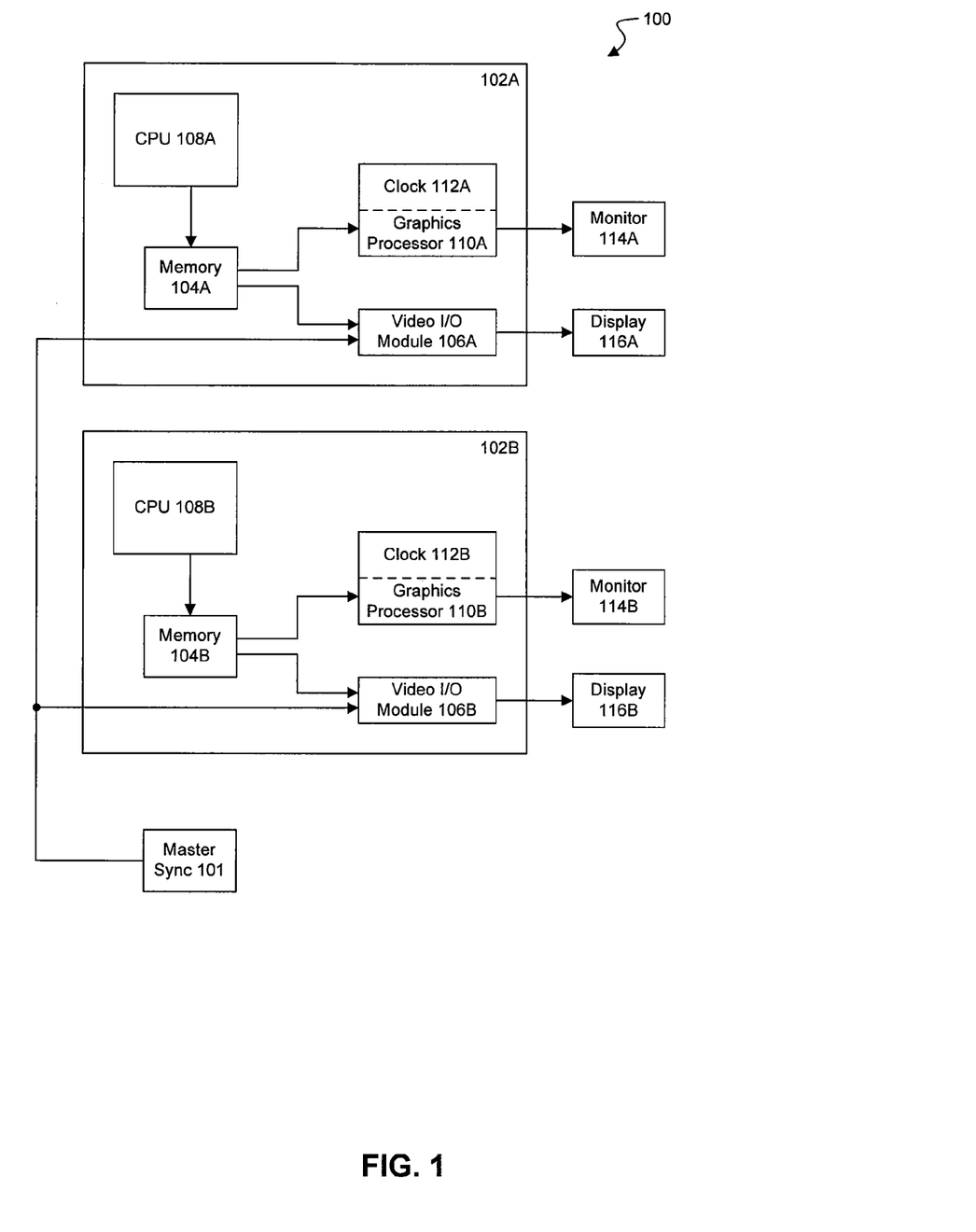
FIG. 1 is a diagram of a first embodiment of a multiple display computer system according to the present invention.

FIG. 1 is a diagram of a multiple display computer graphics system 100 according to a first embodiment of the present invention. The computer graphics system 100 has two or more computer processing systems 102. Two are depicted in this example, but system 100 can contain any number of computer processing systems. In this embodiment, computers 102 are arranged in a flat configuration (i.e., no hierarchical or master/slave type relationship).

Each computer 102 includes a central processing unit (CPU) 108, memory 104, a graphics processor 110, a monitor 114 and a display 116. Graphics processor 110 includes a clock 112. Each computer 102 also includes a video input/output (I/O) module 106. Graphics processor 110 receives graphics data from memory 104 under control of CPU 108 and displays graphical images on monitor 114. Video I/O module 106 receives video data from memory 104 under control of CPU 108 and displays video images on display 116.

In an example embodiment, monitor 114 is a cathode ray tube (CRT), LCD display, active matrix display, plasma display, or projector that displays data in a computer format such as VGA. Display 116 is a cathode ray tube (CRT), LCD display, active matrix display, plasma display, or projector that displays video in a format such as NTSC, PAL, 720p× 1080i, or the like. By convention, the term "monitor" is generally used to refer to a device displaying computer data, while the term "display" is used to refer to a television or video type display device. As used herein, the term "display device" or simply "display" is used to refer to both monitors and displays unless otherwise indicated. In system 100, computers 102 each contribute to display of a video scene on displays 116.

Video I/O modules 106 receive a master sync (or master sync signal) from a master sync signal generator 101. Video I/O modules 106 then synchronize, to the master sync signal, output of the pixel and line based video signals to displays 116. The master sync signal may be any signal from which timing information can be extracted, such as, for example, a timing or clock signal or a video signal. The rate of the timing information extracted from the master sync signal determines the rate at which pixel information will be delivered to displays 116.

Figure 3:
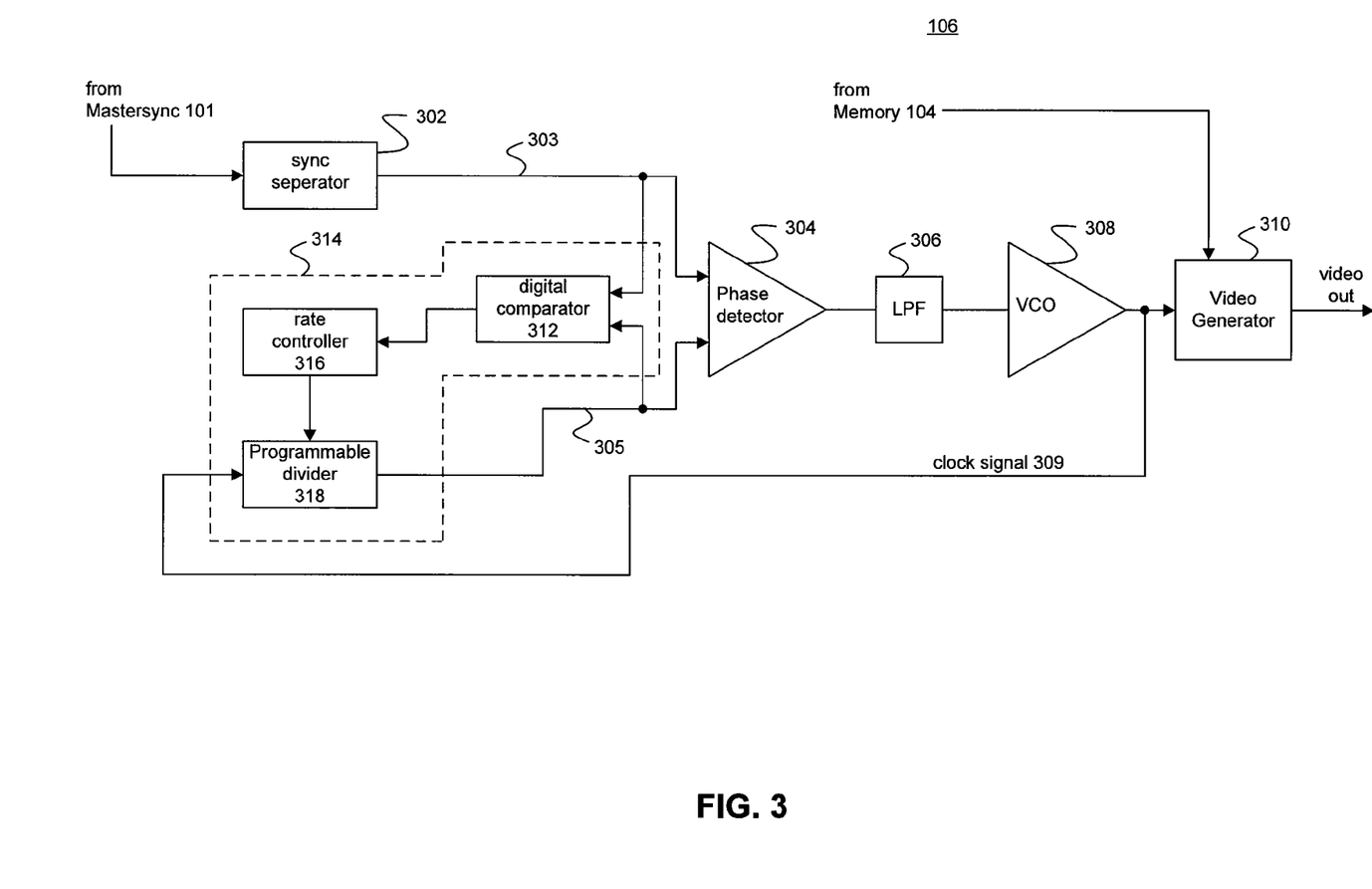
FIG. 3 is a schematic diagram of a video input/output module according to a first embodiment of the present invention.

FIG. 3 is a schematic diagram illustrating the structure and operation of video I/O module 106. Video I/O module 106 includes a sync separator 302, a phase detector 304, a low pass filter (LPF) 306, a voltage controlled oscillator (VCO) 308, a video generator 310, and a digital rate controller circuit 314. Phase detector 304, LPF 306 and VCO 308 are elements of a conventional phase-locked loop (PLL).

Sync separator 302 receives the master sync signal (e.g., a video signal) and extracts a sync or master pulse stream 303. Video and other extraneous information are removed. Master pulse stream 303 represents horizontal sync pulses (i.e., line rate rather than pixel rate). Master pulse stream 303 is then provided to phase detector 304. Phase detector 304 compares master pulse stream 303 to a slave pulse stream 305 received from rate controller circuit 314 and generates a difference pulse stream having pulses of varying widths representing a difference between the compared signals. LPF 306 low-pass filters the difference pulse stream to produce an analog voltage. The analog voltage is then input to VCO 308, where it controls the oscillation frequency of VCO 308. The output of VCO 308 is a video clock signal 309 that is fed to video generator 310. Video clock signal 309 is also fed back to rate controller circuit 314.

Rate controller circuit 314 includes a rate controller 316, a programmable divider 318 and a digital comparator 312. Digital comparator 312 compares master pulse stream 303 to slave pulse stream 305 and produces a difference signal representing the lag or lead of slave pulse stream 305 with respect to master pulse stream 303. The difference signal is provided to rate controller 316. As explained in detail below, rate controller 316 is a programmable device that is software configurable. Rate controller 316 uses the difference signal (lead/lag information) and a programmable lock speed to generate a divisor value to programmable divider 318.

Programmable divider 318 is a countdown circuit. Starting with the divisor value from rate controller 316, divider 318 counts pulses in video clock signal 309 received from VCO 308 and decrements (counts down) the divisor value. When the countdown reaches zero, divider 318 produces an output pulse in slave pulse stream 305. In this countdown manner, divider 318 effectively implements a division operation. For example, if the divisor value is 720 (corresponding to 720 pixels per line), divider 318 will count 720 pulse in video clock signal 309 before issuing one pulse in slave pulse stream 305. This division converts a pixel count signal to a line count signal.

In one embodiment, rate controller 316 includes a programmable register and an adder/subtracter. Rate controller 316 may be programmed by placing in the register the programmable lock speed (i.e., a value that will control how fast or slow the phase-locked loop will respond to changes in the master sync signal). The lead/lag difference signal and the lock speed are then used by the adder/subtracter to produce the divisor value for programmable divider 318. In this manner, the divisor can be dynamically adjusted by rate controller 316 to control the speed or responsiveness of the phase-locked loop. The result is a loop that reacts quickly, but does not introduce jitter or other visual distortions or artifacts into the video signal.

In the 720 pixel per line example set forth above, rate controller 316 could initially set the divisor value to 720. If slave pulse stream 305 starts to lag master pulse stream 303, this will be detected by digital comparator 312 which would increase the value of the difference signal being provided to rate controller 316. In response, rate controller 316 will decrease the divisor to a value of, say, 710. This will cause pulses from divider 318 to arrive at phase detector 304 sooner than before. This, in turn, will cause VCO 308 to slow down, effectively decreasing the response time of the loop. Similarly, if slave pulse stream 305 starts to lead master pulse stream 303, this will be detected by digital comparator 312 which would decrease the value of the difference signal being provided to rate controller 316. In response, rate controller 316 will increase the divisor to a value of, say, 730. This will cause pulses from divider 318 to arrive at phase detector 304 later than before. This, in turn, will cause VCO 308 to speed up, effectively increasing the response time of the loop.

Conventional phase-locked loop circuits control loop speed by setting the cutoff frequency of LPF 306. Such a conventional circuit, however, is not adjustable, and the LPF must be set to either lock quickly (causes jitter), lock slowly (less jitter, but slow to respond), or a compromise setting between fast and slow. The present invention overcomes these deficiencies in conventional systems.

The resultant loop of the invention produces a stable video clock signal 309 that is synchronized with the master sync signal. Video generator 310 uses video clock signal 309 and video information from memory 104 (see FIG. 1) to produce the video signal that is provided to display 116. As would be apparent to a person skilled in the relevant art, video generator 310 includes appropriate video processing circuitry (not shown) including a frame buffer, pixel counter, line counter and associated circuitry.

Figure 2:
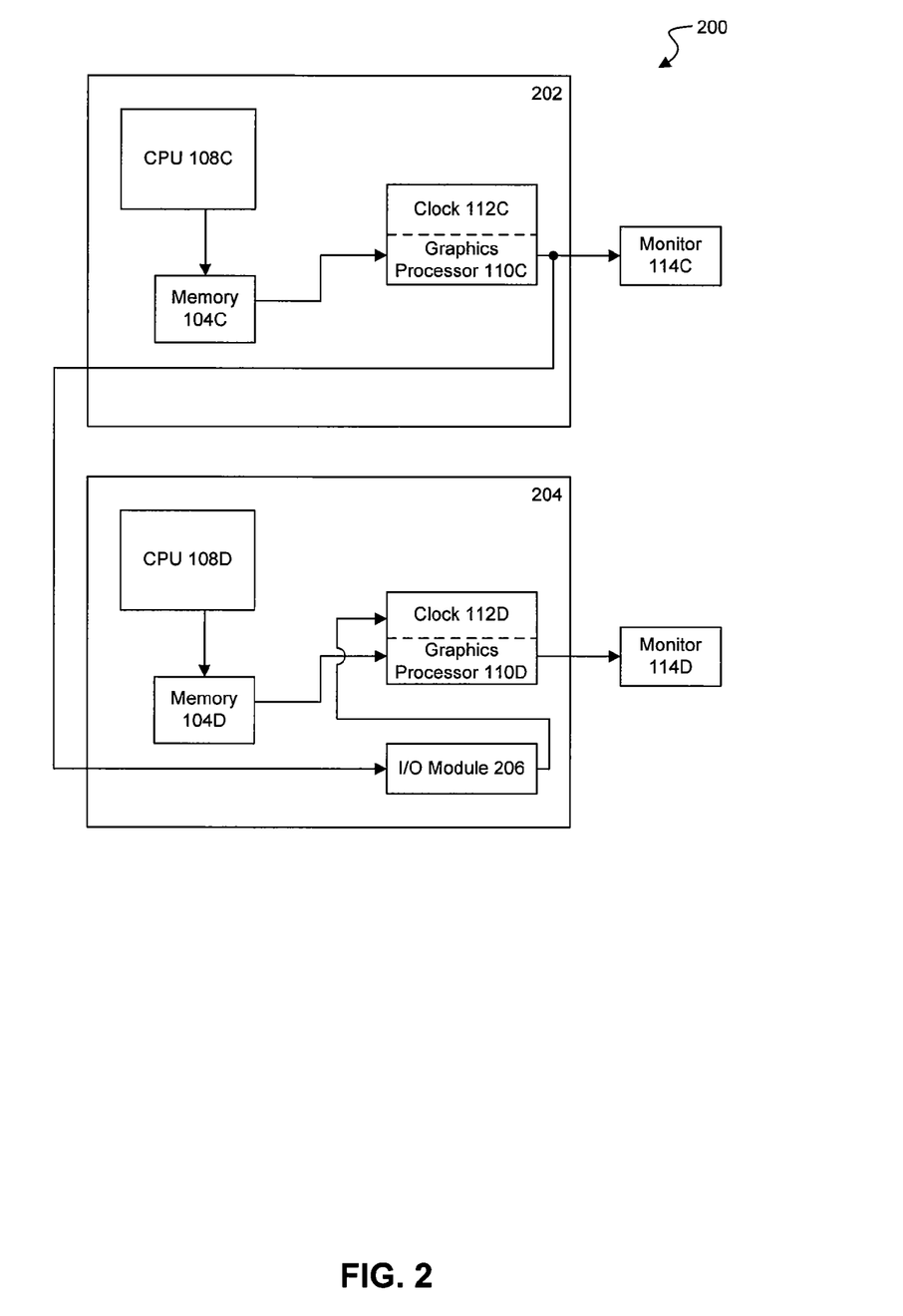
FIG. 2 is a diagram of a second embodiment of a multiple display computer system according to the present invention.

FIG. 2 is a diagram of a multiple display computer graphics system 200 according to a second embodiment of the present invention. Computer graphics system 200 has a master computer processing system 202 and at least one slave computer processing system 204. In this embodiment, computers 202 and 204 are arranged in a hierarchical or master/slave configuration. As with system 100, each computer 202,204 of system 200 includes a central processing unit (CPU) 108, memory 104, a graphics processor 110, and a monitor 114. Graphics processor 110 includes a clock 112. Computer 204 also includes an input/output (I/O) (graphics sync) module 206. Graphics processor 110 receives graphics data from memory 104 under control of CPU 108 and displays graphical images on monitor 114.

As would be apparent to a person skilled in the art, graphics processor 110 produces a display signal having a format appropriate for display on monitor 114. The display signal could be in a VGA format, for example. Each graphics processor (i.e., graphics accelerator or coprocessor) 110 may be any commercially available graphics processor such as the GeForce2 graphics processing unit available from Nvidia Corporation, Santa Clara, Calif., for example.

In the master/slave configuration of system 200, the display signal from graphic processor 110C of computer 202 (the master) is provided to computer 204 (the slave) to act as the master sync signal. I/O Module 206 of computer 204 (described in detail below) is similar to video I/O module 106 of system 100. I/O module 206 produces a clock signal 309 that is fed to clock 112D of graphics processor 110D to synchronize the output of graphics processor 110D of computer 204 to that of graphics processor 110C of computer 202.

Figure 4:
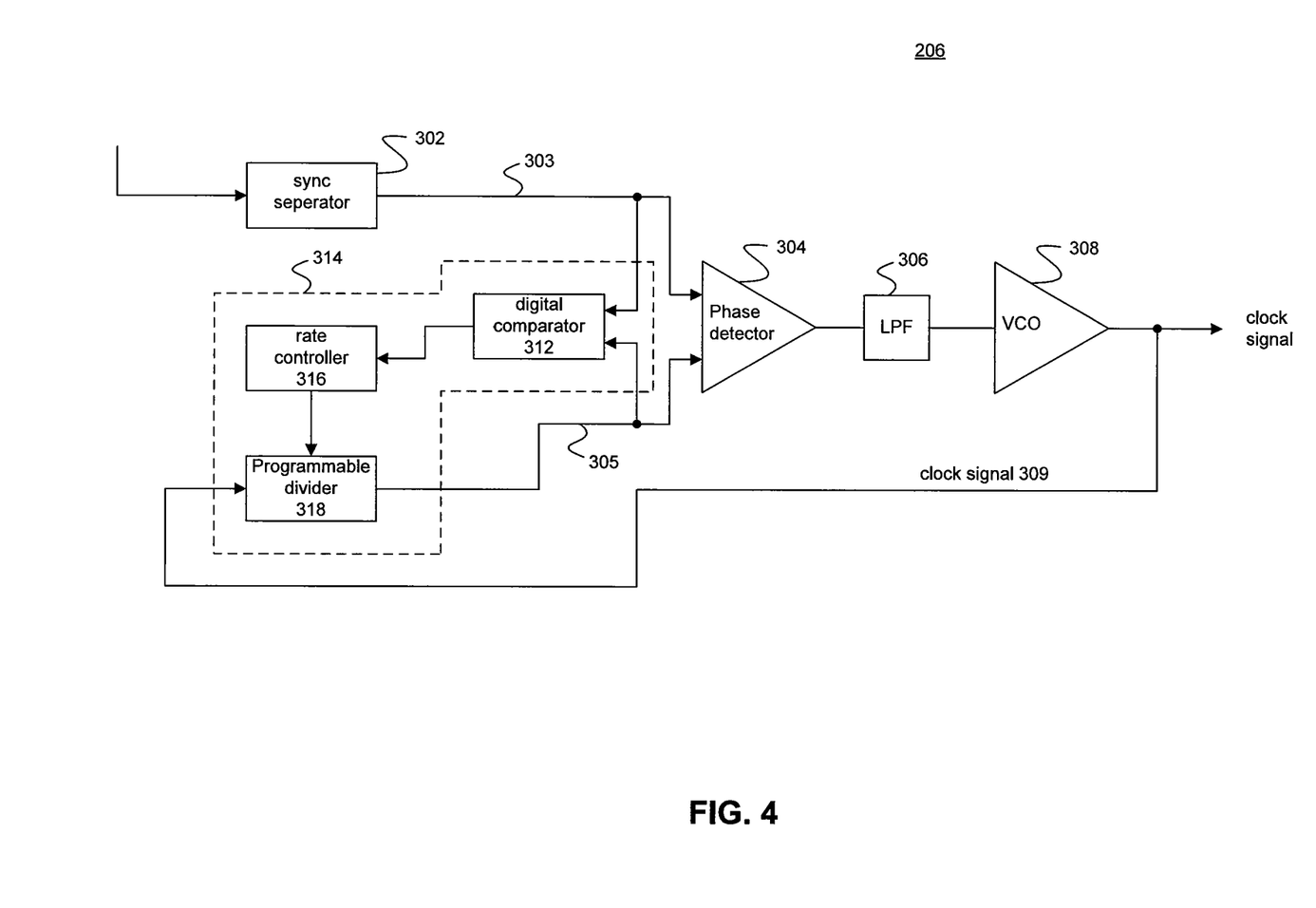
FIG. 4 is a schematic diagram of an input/output (graphics sync) module according to a second embodiment of the present invention.

FIG. 4 is a schematic diagram illustrating the structure and operation of I/O module 206. I/O module 206 is identical in structure and operation to video I/O module 106 discussed above, except that I/O module 206 does not include a video generator 310. Instead, clock signal 309 output by VCO 308 is fed directly to the clock 112D of graphics processor 110D.

Figure 6A:
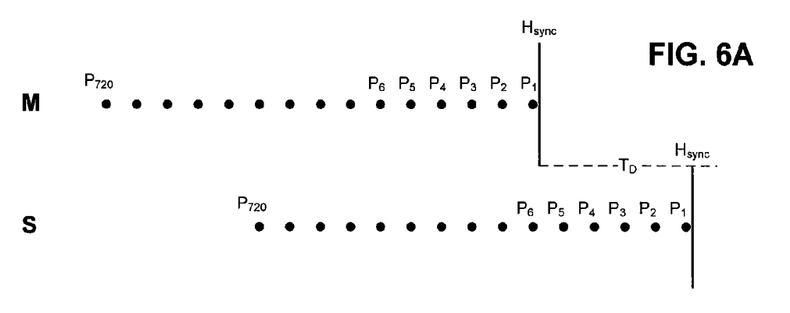
FIGS. 6A-6C illustrate an exemplary horizontal synchronization timing relationship between multiple displays according to an embodiment of the present invention.
Figure 6B:
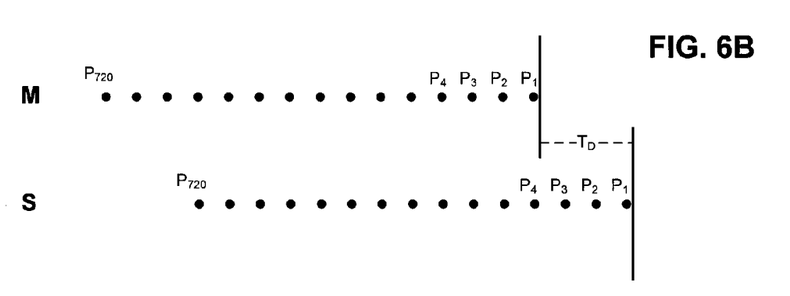

Synchronization of two video signal according to the present invention is further illustrated below with reference to FIGS. 3 and 6. Referring to FIG. 6A, a master pulse stream (M) and a slave pulse stream (S) are shown. As is apparent by the time differential (TD) between the horizontal synchronization pulses ($H_{sync}$), the slave pulse stream (S) is five pixel pulses ahead of the master pulse stream (M). Referring to FIG. 6B, during a first iteration of the loop of I/O modules 106/206, slave pulse stream (S) is slowed by two pixel pulses. The time differential (TD) between the $H_{sync}$ pulses in the two pulse streams is now only three pulses.

Figure 6C:
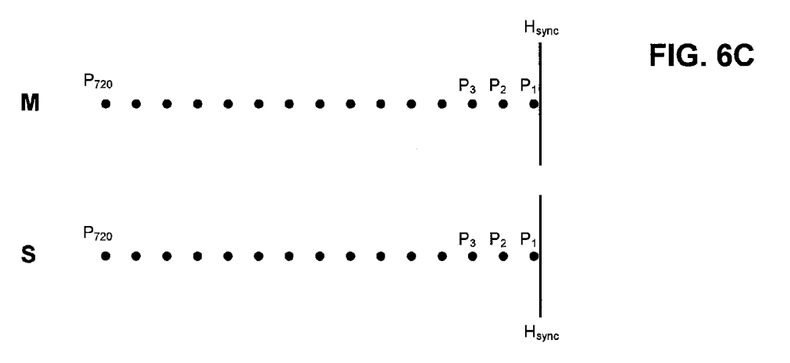

Referring to FIG. 6C, during a next iteration of the synchronization loop, the slave pulse stream (S) is slowed by three pixel pulses. The time differential (TD) between the $H_{sync}$ pulses in the two pulse streams is now zero. By gradually bringing the master and slave pulse streams into synchronization in this manner, visual distortions are minimized. As compared to the invention, conventional systems would either (1) respond too slowly to an out-of-sync condition, or (2) would snap the slave pulse stream into synchronization with the master pulse stream, causing a visual distortion.

An advantage of the present invention is that the convergence time (i.e., how quickly the slave pulse stream can be synchronized to the master pulse stream) can be programmably adjusted via rate controller circuit 314. That is, the amount of time (i.e., in pixel pulses) added to (or removed from) the slave pulse stream during each iteration of the loop will determine how quickly the loop converges and achieves synchronization. For gross adjustments, the loop may be adjusted more coarsely (i.e., more pulses added/removed during each loop iteration) when the signals are grossly out of synchronization, and more finely (i.e., fewer pulses added/removed during each loop iteration) when the signals are closer to being synchronized. This produces a dynamically self-adjusting, phase-locked loop that is quick to respond, but stable enough to prevent visual distortions.

The present invention has been described in a multi-display computer system wherein one computer drives each display. In other embodiments, however, a single computer may have multiple processors, wherein each processor generates video and/or computer graphics images for a corresponding display device. Moreover, each computer described herein may be, for example, a general purpose computer such as a personal computer, workstation or mainframe, or may be a special purpose computer such as a video player, game console, or the like. One skilled in the relevant art will recognize other arrangements that can benefit from, without departing from the scope of, the present invention.

In one embodiment, the invention is implemented primarily in firmware and/or hardware using, for example, hardware components such as application specific integrated circuits (ASICs). Implementation of a hardware state machine to perform the functions described herein will be apparent to a person skilled in the relevant art. In another embodiment where the invention is implemented using software, the software may be stored in a computer program product and loaded into computer systems 102, 202 and/or 204 via a network connection or via computer readable media such as a diskette, CD, DVD, or ROM device. The control logic (software), when executed by the one or more processors 108, causes the processor(s) 108 to perform the functions of the invention as described herein.

Various embodiments of the present invention have been described above. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for synchronizing the display of images on a plurality of display devices, comprising:
    generating a first signal representing first image data to be displayed on a first display;
    generating a second signal representing second image data to be displayed on a second display;
    generating at a first signal generator a master sync signal;
    receiving at a second signal generator the master sync signal;
    generating at the second signal generator a video clock signal based on the received master sync signal, wherein the video clock signal provides a timing information for one of display of the first image data on the first display or display of the second image data on the second display;
    programming a convergence time which determines a quantity of pixel pulses by which to adjust the video dock signal to establish a synchronization between the video clock signal and the master sync signal, wherein the quantity of pixel pulses is selected based on a degree of synchronization between the video clock signal and the master sync signal;
    adjusting the video clock signal based on the convergence time;
    determining if the video clock signal is not synchronized with the master sync signal; and
    in response to determining that the video clock signal is not synchronized with the master sync signal, reprogramming the convergence time using a new quantity of pixel pulses based on a degree of synchronization between the adjusted video clock signal and the master sync signal.

2. The method of claim 1, further comprising:
    generating the video clock signal at the second signal generator using a phase-locked loop of the second signal generator.

3. The method of claim 2, further comprising:
    establishing the synchronization between the video clock signal and the master sync signal using the phase-locked loop.

4. The method of claim 3, further comprising:
    determining, using a programmable rate controller circuit of the second signal generator, if the video clock signal is not synchronized with the master sync signal; and
    controlling via the rate controller circuit a rate at which the phase-locked loop establishes the synchronization between the video clock signal and the master sync signal, wherein a faster lock responsiveness rate results in a shorter convergence time and a slower lock responsiveness rate results in a longer convergence time:

5. The method of claim 4, further comprising:
    programming the rate controller circuit to determine the rate at which the phase-locked loop establishes the synchronization between the video clock signal and the master sync signal.

6. The method of claim 2, further comprising:
    comparing, at a phase detector of the phase-locked loop, a master pulse stream of the master sync signal to a slave pulse stream of the second signal generator to produce a difference pulse stream, wherein a width of a difference pulse in the difference pulse stream represents a difference between the master pulse stream and the slave pulse stream;
    filtering, at a low pass filter of the phase-locked loop, the difference pulse stream to produce an analog signal; and
    generating, at a voltage controlled oscillator of the phase-locked loop, the video clock signal in response to the analog signal.

7. The method of claim 6, further comprising:
    generating, via a programmable rate controller circuit of the second signal generator, a divisor value based on a programmable lock speed and a comparison of the master pulse stream to a first state of the slave pulse stream; and
    dividing, at the rate controller circuit, the video clock signal by the divisor value to produce a second state of the slave pulse stream.

8. The method of claim 7, wherein the programmable rate controller is comprised of a digital comparator, a rate controller, and a programmable divider, the method further comprising:

generating at the digital comparator a lead/lag difference signal by comparing the master pulse stream and the first state of the slave pulse stream;

generating at the rate controller the divisor value based on the lead/lag difference signal and the programmable lock speed; and producing the second state of the slave pulse stream by dividing, at the programmable divider, the video clock signal by the divisor value to generate an output pulse in the slave pulse stream, wherein the output pulse is generated each time the programmable divider counts off a number of pulses in the video clock signal, the number of pulses being equal to the divisor value.

9. A method for synchronizing to a first digital signal. generation of a second digital signal, comprising:

comparing at a phase detector a phase of the first digital signal to a phase of a comparison pulse stream to produce a difference pulse stream;

low pass filtering said difference pulse stream to produce an analog signal;

receiving at a voltage controlled oscillator the analog signal, wherein the voltage controlled oscillator produces the second digital signal in response to the analog signal;

dividing at a programmable rate controller circuit the second digital signal by a divisor value to produce said comparison pulse stream, wherein said rate controller circuit produces said divisor value based on a programmable rate value and a comparison of the first digital signal and said comparison pulse stream.

10. A method for synchronizing the display of images on a plurality of display devices, each display having an associated video signal generator, comprising:

generating a master sync signal from a master sync signal generator;

receiving the master sync signal at a first video signal generator associated with a first display of the plurality of display devices;

generating at the first video signal generator a first video clock signal from the master sync signal;

determining that the first video clock signal is not synchronized with the master sync signal;

in response to determining that the first video clock signal is not synchronized with the master sync signal, establishing a synchronization between the first video clock signal and the master sync signal;

wherein the establishment of the synchronization between the first video clock signal and the master sync signal comprises adjusting the first video clock signal by a first quantity of pixel mikes selected based on a degree of synchronization between the first video clock signal and the master sync signal, such that a rate of the convergence of the first video dock signal and the master sync signal is thereby programmably adjustable.

11. The method of claim 10, further comprising:

receiving the master sync signal at a second video signal generator associated with a second display of the plurality of display devices;

generating at the second signal generator a second video clock signal from the master sync signal;

determining that the second video clock signal is not synchronized with the master sync signal;

in response to determining that the second video clock signal is not synchronized with the master sync signal, establishing a synchronization between the second video clock signal and the master sync signal;

wherein the establishment of the synchronization between the second video clock signal and the master sync signal comprises adjusting the second video clock signal by a second quantity of pixel pulses selected based on a degree of synchronization between the second video clock signal and the master sync signal, such that a rate of the convergence of the second video clock signal and the master sync signal is thereby programmably adjustable.

12. The method of claim 10, further comprising generating the master sync signal from a master sync signal generator which is a video signal generator associated with one display of the plurality of displays.

13. The method of claim 12, further comprising using the master sync signal generated at the video signal generator associated with the one display of the plurality of displays as the video clock signal of the one display.

14. The method of claim 10, further comprising generating the master sync signal from a master sync signal generator which is a video signal generator not associated with any display of the plurality of displays.

15. The method of claim 10, further comprising generating the first video clock signal from the master sync signal at a phase-locked loop of the video signal generator.

16. The method of claim 15, further comprising establishing the synchronization between the first video clock signal and the master sync signal via the phase-locked loop.

17. The method of claim 16, further comprising determining, via a programmable rate controller circuit of the first video signal generator; if the first video clock signal is not synchronized with the master sync signal.

18. The method of claim 17, further comprising controlling via the programmable rate controller circuit a lock responsiveness rate at which the phase-locked loop establishes the synchronization between the first video clock signal and the master sync signal, wherein:

a faster lock responsiveness rate results in a faster speed of the convergence of the first video clock signal and the master sync signal;

and a slower lock responsiveness rate results in a slower speed of the convergence of the first video clock signal and the master sync signal.

19. A method for minimizing image distortion when synchronizing the displays of a plurality of images on a plurality of display elements, comprising:

receiving a plurality of image signals representing image data, wherein each respective display element of the plurality of display elements is configured to display a respective image signal;

receiving a master synchronization (sync) signal at a plurality of graphics systems, wherein each graphics system of the plurality of graphics systems is associated with a respective display element of the plurality of display elements;

programming at each graphics system a respective convergence time which determines a quantity of pixel pulses by which to adjust a video clock signal of a graphics system of the plurality of graphics systems to establish a synchronization between the video clock signal and the master sync signal, wherein the quantity of pixel pulses is selected based on a degree of synchronization between the video clock signal and the master sync signal;

adjusting the video clock signal based on the convergence time;

determining that the vide(clock signal is desynchronized with the master synchronization signal; and in response to determining that the video clock signal is desynchronized with the master synchronization signal, reprogramming the convergence time using a new quantity of pixel pulses based on a degree of synchronization between the adjusted video clock signal and the master sync signal.

20. The method of claim 19, farther comprising generating the master synchronization signal from a signal generator which is not an element of any graphics system of the plurality of graphics systems.

21. The method of claim 19, further comprising generating the master synchronization signal from a signal generator which is an element of a first one of the graphics systems of the plurality of graphics systems, wherein:
said first one of the graphics systems is a master graphics system with respect to image synchronization; and
a graphics system of the plurality of graphics systems which is not said first one of the graphics systems is a slave graphics system with respect to image synchronization.

22. The method of claim 21, wherein the video clock signal of the first one of the graphics systems is the same as the master synchronization signal generated by the signal generator.

23. The method of claim 19, wherein outputting from each graphics system to its respective display element the respective image signal comprises outputting, according to the video clock signal, at least one of a video pixel, a video line, or a video frame.

24. A method for synchronizing the display of images on a plurality of display devices, comprising:
generating a first signal representing first image data to be displayed on a first display;
generating a second signal representing second image data to be displayed on a second display;
generating at a first signal generator a master sync signal;
receiving at a second signal generator the master sync signal;
generating at the second signal generator a video clock signal, using a phase-locked loop of the second signal generator, based on the received master sync signal, wherein the video clock signal provides a timing information for one of display of the first image data on the first display or display of the second image data on the second display;
programming a convergence time which determines a time duration required to establish a synchronization between the video clock signal and the master sync signal;
determining if the video clock signal is not synchronized with the master sync signal;

in response to determining that the video clock signal is not synchronized with the master sync signal, establishing over the time duration of the convergence time the synchronization between the video clock signal and the master sync signal;
comparing, at a phase detector of the phase-locked loop, a master pulse stream of the master sync signal to a slave pulse stream of the second signal generator to produce a difference pulse stream, wherein a width of a difference pulse in the difference pulse stream represents a difference between the master pulse stream and the slave pulse stream;
filtering, at a low pass filter of the phase-locked loop, the difference pulse stream to produce an analog signal;
generating, at a voltage controlled oscillator of the phase-locked loop, the video clock signal in response to the analog signal;
generating, via a programmable rate controller circuit of the second signal generator, a divisor value based on a programmable lock speed and a comparison of the master pulse stream to a first state of the slave pulse stream; and
dividing, at the rate controller circuit, the video clock signal by the divisor value to produce a second state of the slave pulse stream;
wherein said time duration is a measure of a time interval which begins at the start of establishing the synchronization and ends at the completion of the synchronization.

25. The method of claim 24, wherein the programmable rate controller is comprised of a digital comparator, a rate controller, and a programmable divider, the method further comprising:
generating at the digital comparator a lead/lag difference signal by comparing the master pulse stream and the first state of the slave pulse stream;
generating at the rate controller the divisor value based on the lead/lag difference signal and the programmable lock speed; and
producing the second state of the slave pulse stream by dividing, at the programmable divider, the video clock signal by the divisor value to generate an output pulse in the slave pulse stream, wherein the output pulse is generated each time the programmable divider counts off a number of pulses in the video clock signal, the number of pulses being equal to the divisor value.

* * * * *